(12) United States Patent
Wang et al.

(10) Patent No.: US 11,991,782 B2
(45) Date of Patent: May 21, 2024

(54) METHOD AND APPARATUS FOR NETWORK FUNCTION SERVICE DISCOVERY

(71) Applicant: Telefonaktiebolaget LM Ericsson (publ), Stockholm (SE)

(72) Inventors: Cheng Wang, Shanghai (CN); Yong Yang, Kållered (SE); Gang Ren, Shanghai (CN); Xiao Li, Shanghai (CN); Xinyu Zhang, Shanghai (CN); Junyi Wang, Shanghai (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/724,966

(22) Filed: Apr. 20, 2022

(65) Prior Publication Data

US 2022/0248212 A1    Aug. 4, 2022

Related U.S. Application Data

(63) Continuation of application No. 16/755,260, filed as application No. PCT/CN2018/104780 on Sep. 10, 2018, now Pat. No. 11,343,669.

(51) Int. Cl.
*H04W 12/06* (2021.01)
*H04W 4/00* (2018.01)
(Continued)

(52) U.S. Cl.
CPC ............ *H04W 8/20* (2013.01); *H04W 48/18* (2013.01); *H04W 60/00* (2013.01); *H04L 2101/654* (2022.05)

(58) Field of Classification Search
None
See application file for complete search history.

(56) References Cited

U.S. PATENT DOCUMENTS

| 11,343,669 B2 * | 5/2022 | Wang .................. H04L 67/51 |
| 2009/0262684 A1 | 10/2009 | Khetawat et al. |

(Continued)

FOREIGN PATENT DOCUMENTS

| CN | 105900518 A | 8/2016 |
| CN | 106550410 A | 3/2017 |

(Continued)

OTHER PUBLICATIONS

Official Action issued for Chinese Patent Application No. 201880065732.5—dated Dec. 23, 2022.

(Continued)

*Primary Examiner* — Gary Lafontant
(74) *Attorney, Agent, or Firm* — Baker Botts L.L.P.

(57) ABSTRACT

Embodiments of the present disclosure provide methods, apparatus and computer program products for network function service discovery. A method implemented at a second network node in a wireless core network with service based architecture comprises: receiving a registration request for network function instance from a network function, the registration request comprising information identifying a subscriber group to which the network function instance is applicable; and storing the information in association with the network function instance. With embodiments of the disclosure, size of NF profile can be saved.

17 Claims, 7 Drawing Sheets

(51) Int. Cl.
*H04W 8/20* (2009.01)
*H04W 48/18* (2009.01)
*H04W 60/00* (2009.01)
*H04L 101/654* (2022.01)

(56) References Cited

U.S. PATENT DOCUMENTS

| | | | |
|---|---|---|---|
| 2014/0358759 | A1 | 12/2014 | Smith et al. |
| 2015/0023207 | A1 | 1/2015 | Lan et al. |
| 2017/0085486 | A1 | 3/2017 | Chung et al. |
| 2017/0339003 | A1 | 11/2017 | Astrom et al. |
| 2019/0132839 | A1* | 5/2019 | Li .................... H04W 74/04 |
| 2019/0166467 | A1* | 5/2019 | Livanos ............ H04W 8/186 |
| 2019/0261260 | A1* | 8/2019 | Dao et al. ......... H04W 48/18 |

FOREIGN PATENT DOCUMENTS

| | | | |
|---|---|---|---|
| JP | 2017143363 | A | 8/2017 |
| JP | 2018032935 | A | 3/2018 |
| RU | 2010 133 967 | A | 2/2012 |
| WO | 2017 118489 | A1 | 7/2017 |
| WO | 2017124801 | A1 | 7/2017 |

OTHER PUBLICATIONS

SA WG2 Meeting #121; HangZhou, China; Source: ZTE, Telecom Italia, Oracle, ETRI; Title: 23.501 P-CR: Network Slicing Update for supporting standalone NSSF plus miscellaneous changes to the existing text (S2-173362)—May 15-19, 2017.
3GPP TS 23.501 v1.3.0; Technical Specification; 3rd Generation Partnership Project; Technical Specification Group Services and System Aspects; System Architecture for the 5G System; Stage 2 (Release 15)—Sep. 2017.
3GPP TS 23.502 v1.0.0; Technical Specification; 3rd Generation Partnership Project; Technical Specification Group Services and Systems Aspects; Procedures for the 5G System; Stage 2 (Release 15)—Sep. 2017.
PCT Notification of Transmittal of the International Search Report and the Written Opinion of the International Searching Authority, or the Declaration issued for International application No. PCT/CN2018/104780—dated Nov. 28, 2018.
PCT International Search Report for International application No. PCT/CN2018/104780—dated Nov. 18, 2018.
PCT Written Opinion of the International Searching Authority for International application No. PCT/CN2018/104780—dated Nov. 28, 2018.
SA WG2 Meeting #116; Source: China Mobile, CATT, CATR; Title: Network slicing selection solution based on Slice Instance ID; Vienna, Austria (S2-163344, revision of S2-16xxxxx)—Jul. 11-15, 2016.
SA WG2 Meeting #120; Source: Huawei, Hisilicon; Title: TS 23.501: Update to Network Slice Parameters; Busan, South Korea (S2-172064)—Mar. 27-31, 2017.
SA WG2 Meeting #121; Source: NTT Docomo, Ericsson, Huawei, Hisilicon; Title: Update to Network Slice Selection Parameters; Hangzhou, China (S2-173498)—May 15-19, 2017.
Japanese Notice for Reasons for Rejection issued for Patent Application No. 2020-520201—dated Jun. 15, 2021.
SA WG2 Meeting #122Bis; Sophia, Antipolis, France; Source: Huawei, Hisilicon, SK Telecom, China Mobile; Title: Pseudo CR on TS 23.502 for NF registration, update and deregistration (S2-176455, revision of S2-175781)—Aug. 21-25, 2017.
SA WG2 Meeting #122bis; Sophia, Antipolis, France; Source: Huawei, Hisilicon, Ericsson, Samsung; Title: Pseudo CR on TS 23.501 to resolve editor's note on notify without subscribe (S2-176653, revision of S2-176634, revision of S2-176382, revision of S2-175411)—Aug. 21-25, 2017.
Communication Pursuant to Article 94(3) EPC issued for Application No. 18 867 129.1-1216—dated Feb. 3, 2022.
PCT Notification Concerning Transmittal of International Preliminary Report on Patentability (Chapter I of the Patent Cooperation Treaty) issued for International application No. PCT/CN2018/104780—dated Apr. 14, 2020.
Office Action issued by the Russian Department of Electrical Engineering and Electronics for Application No. 2020115443—dated Aug. 18, 2020.
3GPP TR 29.891 v1.0.0; Technical Report; 3rd Generation Partnership Project; Technical Specification Group Core Network and Terminals; 5G System—Phase 1; CT WG4 Aspects (Release 15)—Sep. 2017.
3GPP TS 23.501 v.1.1.0; Technical Specification; 3rd Generation Partnership Project; Technical Specification Group Services and System Aspects; System Architecture for the 5G System; Stage 2 (Release 15)—Jul. 2017.
3GPP TSG CT4 Meeting #79; Krakow, Poland; Source: Nokia, Alcatel-Lucent Shanghai Bell, Verizon, AT&T; Title: Pseudo-CR on NF Service Discovery and Selection Requirements (C4-174329)—Aug. 21-25, 2017.
Extended European Search Report issued for Application No./Patent No. 18867129.1-1216 / 3689069 PCT/CN2018104780—dated Oct. 16, 2020.
JP Decision to Grant issued for Patent application No. 2020-520201—dated Oct. 19, 2021.
SA WG2 Meeting #122bis; Sophia Antipolis France; Source: Huawei, HiSilicon; Ericsson; Samsung; Title: Pseudo CR on 23.501 to resolve editor's note on notify without subscribe (S2-176653 (revision of S2-176634) (revision of S2-176382) (revision of S2-175411))—Aug. 21-25, 2017.
3GPP SA WG2 Meeting #120 S2-172064 Mar. 31, 2017 (Year: 2017).
Background Technical Examination issued by the Argentinian National Institute of Industrial Property for Application No. 20180102987—dated Dec. 21, 2021.
3GPP TSG CT4 Meeting #79; Krakow, Poland; Aug. 21-25, 2017; Source: Nokia, Alcatel-Lucent Shanghai Bell, Verizon, AT&T; Title: Pseudo-CR on NF Service Discovery and Selection Requirements; Spec: 3GPP TR 29.891 v0.3.0; Agenda item: 6.2.1 (C4-174233).
Notice of Allowance issued for Chinese Application No. 201880065732.5—dated Jul. 27, 2023.
3GPP TS 23.501 v1.1.0 (Jul. 2017) 3rd Generation Partnership Project; Technical Specification Group Services and System Aspects; System Architecture for the 5G System; Stage 2 (Release 15).
3GPP TR 29.891 v1.0.0 (Sep. 2017) 3rd Generation Partnership Project; Technical Specification Group Core Network and Terminals; 5G System—Phase 1; CT WG4 Aspects (Release 15).
3GPP TSG CT4 Meeting #79; Krakow, Poland; Aug. 21-25, 2017; Source: Nokia, Alcatel-Lucent Shanghai Bell, Verizon, AT&T; Title: Pseudo-CR on NF Service Discovery and Selection Requirements; Spec: 3GPP TR 29.891 v0.3.0; Agenda item: 6.2.1 (C4-174329).
SA WG2 Meeting #122; Jun. 26-30, 2017, Las Cabos, Mexico; Source: Nokia, Alcatel-Lucent Shanghai Bell, AT&T, NTT Docomo; Title: 23.501 § 5.6.7 & 5.13: Support of Groups and improvements of the support of Edge Computing; Agenda Item: 5.6.3 (S2-175282 (was S2-175165).
Extended European Search Report issued for Application No. / Patent No. 23214749.6-1216—Mar. 1, 2024.

* cited by examiner

METHOD AND APPARATUS FOR NETWORK FUNCTION SERVICE DISCOVERY

TECHNICAL FIELD

The non-limiting and exemplary embodiments of the present disclosure generally relate to the technical field of wireless communications, and specifically to methods, apparatuses and computer programs for network function service discovery.

BACKGROUND

This section introduces aspects that may facilitate a better understanding of the disclosure. Accordingly, the statements of this section are to be read in this light and are not to be understood as admissions about what is in the prior art or what is not in the prior art.

Currently core network architecture for next generation (5G) network has been proposed. The 5G core network employs service based architecture (SBA). FIG. 1 shows a high level architecture of 5G core network SBA. In 5G core network SBA, conventional network elements in LTE network are replaced with network functions (NF). Each NF may provide many NF services. As shown in FIG. 1, 5G core network SBA may comprise AMF (Access and mobility Function), SMF (Session Management Function), AUSF (Authentication Service Function), UDM (Unified Data Management), PCF (Policy Control Function), AF (Application Function), NEF (Network Exposure Function), and NRF (NF Repository Function).

NRF may support NF service registration and NF service discovery. For the NRF to properly maintain information of available NF instances and their supported services, each NF instance informs the NRF of a list of NF services that it supports and other NF instance information during the NF service registration. Each NF instance may have a NF profile. The NF profile may include NF instance identifier (ID), NF type, PLMN ID, network slice related identifier(s), FQDN (Fully Qualified Domain Name) or IP address of NF, NF capacity information, names of supported services, endpoint information of instance(s) of each supported service, etc.

The NF service discovery may be implemented by supporting NF discovery (which may be also referred to as "NF selection") using the NRF. The NF selection consists in selecting one NF instance among the NF instance(s) discovered during the NF service discovery. The NF selection may be implemented by a requester NF. For example, UDM selection may be implemented by the AMF.

SUMMARY

Various embodiments of the present disclosure mainly aim at providing methods, apparatuses and computer programs for network function service discovery. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method implemented at a first network node in a wireless core network with service based architecture. The method may comprise: determining, in response to trigger of network function selection for a terminal device of the wireless core network, at least one subscriber group that the terminal device is matched with; retrieving at least one network function instance for the at least one subscriber group; and storing the at least one network function instance in association with the at least one subscriber group.

In some embodiment, the method may further comprise obtaining subscriber group information of a plurality of subscriber groups.

In some embodiment, the subscriber group information may comprise a subscriber group identifier or a policy of deriving a subscriber group identifier.

In some embodiment, the subscriber group identifier may be represented by one of at least one International Mobile Subscriber Identity (IMSI) range, a portion of Network Access Identifier (NAI), and a part or whole of network slice selection information.

In some embodiments, the subscriber group identifier may be an identifier mapped to at least one International Mobile Subscriber Identity (IMSI) range or a portion of Network Access Identifier (NAI) or a part or whole of network slice selection information.

In some embodiments, the subscriber group identifier may be specific to a network function.

In some embodiments, determining at least one subscriber group that the terminal device is matched with may comprise: obtaining a subscriber identifier of the terminal device and/or network slice selection information provided by the terminal device; comparing the subscriber identifier of the terminal device and/or the network slice selection information with subscriber group identifiers of a plurality of subscriber groups; and determining, in response to the subscriber group identifier being a part of the subscriber identifier and/or a part of the network slice selection information, the terminal device is matched with the subscriber group having the subscriber group identifier.

In some embodiments, determining at least one subscriber group that the terminal device is matched with may comprise: obtaining a subscriber identifier of the terminal device and/or network slice selection information provided by the terminal device; and deriving at least one subscriber group identifier from the subscriber identifier and/or the network slice selection information.

In some embodiments, retrieving at least one network function instance corresponding to the at least one subscriber group may comprise: sending a first request for discovering network function instance, the first request comprising a subscriber group identifier of the at least one subscriber group; and receiving a first response comprising at least one network function instance for the subscriber group.

In some embodiments, the method may further comprise checking whether any network function instance has been cached locally for the subscriber group that the terminal device is matched with. In an embodiment, the retrieving is performed in response to no network function instance being cached locally for the subscriber group.

In some embodiments, obtaining subscriber group information of a plurality of subscriber groups may comprise: sending a second request for querying subscriber group information of a plurality of subscriber groups; and receiving a second response comprising the subscriber group information.

In some embodiments, obtaining subscriber group information of a plurality of subscriber groups may comprise receiving the subscriber group information from another first network node.

In some embodiments, the subscriber identifier of the terminal device may be an IMSI or a NAI.

In some embodiments, the first network node may be a network function service consumer.

In a second aspect of the disclosure, there is provided a method implemented at a second network node in a wireless core network with service based architecture. The method may comprise: receiving a registration request for network function instance from a network function, the registration request comprising information identifying a subscriber group to which the network function instance is applicable; and storing the information in association with the network function instance.

In some embodiment, the information is represented by one of a subscriber group identifier, an International Mobile Subscriber Identity (IMSI) range, two or more IMSI ranges, and a part or whole of network slice selection information. The subscriber group identifier can be a portion of Network Access Identifier (NAI). The network slice selection information may include Network Slice Selection Assistance Information (NSSAI).

In some embodiments, the information is mapped to one of a subscriber group identifier, at least one International Mobile Subscriber Identity (IMSI) range, or a part or whole of network slice selection information. The subscriber group identifier can be a portion of NAI. The network slice selection information may include NSSAI.

In some embodiments, the method may further comprise: receiving a first request for discovering network function instance, the first request comprising information for a subscriber group; determining at least one network function instance for the subscriber group, according to the information for the subscriber group and the second network node's storage; and sending a first response comprising the at least one network function instance for the subscriber group.

In some embodiments, the method may further comprise: receiving a second request for querying subscriber group information of a plurality of subscriber group; and sending a second response comprising the subscriber group information of the plurality of subscriber group.

In some embodiments, the information for a subscriber group may comprise a subscriber group identifier or a policy of deriving a subscriber group identifier.

In some embodiments, the subscriber group identifier may be specific to a network function.

In some embodiments, the method may further comprise receiving registration of a network function instance and information identifying a subscriber group to which the network function instance is applicable via a third party registration entity.

In some embodiments, the second network node may be a network function repository.

In a third aspect of the disclosure, there is provided a method implemented at a third network node in a wireless core network with service based architecture. The method may comprise: registering, by sending a registration request for network function instance to a second network node. The registration request comprises information identifying a subscriber group to which the network function instance is applicable. The second network node is a network function repository.

In some embodiments, the third network node is a network function or a third party registration entity.

In a fourth aspect of the disclosure, there is provided an apparatus in a first network node in a wireless core network with service based architecture. The apparatus may comprise a processor and a memory coupled to the processor. The memory may contain instructions executable by the processor, whereby the apparatus is operative to: determine, in response to trigger of network function selection for a terminal device of the wireless core network, at least one subscriber group that a terminal device of the wireless core network is matched with, retrieve at least one network function instance for the at least one subscriber group, and store the at least one network function instance in association with the at least one subscriber group.

In some embodiments, the apparatus is further operative to obtain subscriber group information of a plurality of subscriber groups.

In some embodiments, the apparatus is operative to obtain a subscriber identifier of the terminal device and/or network slice selection information provided by the terminal device, compare the subscriber identifier of the terminal device and/or the network slice selection information with subscriber group identifiers of a plurality of subscriber groups, and determine, in response to the subscriber group identifier being a part of the subscriber identifier and/or a part of the network slice selection information, the terminal device is matched with the subscriber group having the subscriber group identifier.

In some embodiments, the apparatus is operative to: obtain a subscriber identifier of the terminal device and/or network slice selection information provided by the terminal device, and derive at least one subscriber group identifier from the subscriber identifier and/or the network slice selection information.

In some embodiments, the apparatus is operative to: send a first request for discovering network function instance, the first request comprising a subscriber group identifier of the at least one subscriber group, and receive a first response comprising at least one network function instance for the subscriber group.

In some embodiments, the apparatus is further operative to check whether any network function instance has been cached locally for the subscriber group that the terminal device is matched with. In an embodiment, the apparatus is operative to retrieve the at least one network function instance in response to no network function instance being cached locally for the subscriber group.

In some embodiments, the apparatus is operative to: send a second request for querying subscriber group information of a plurality of subscriber groups, and receive a second response comprising the subscriber group information.

In a fifth aspect of the disclosure, there is provided an apparatus in a second network node in a wireless core network with service based architecture. The apparatus may comprise a processor and a memory coupled to the processor. The memory may contain instructions executable by the processor, whereby the apparatus is operative to: receive a registration request for network function instance from a network function, the registration request including information identifying a subscriber group to which the network function instance is applicable, and store the information identifying the subscriber group in association with the network function instance.

In some embodiments, the apparatus is further operative to: receive a first request for discovering network function instance, the first request comprising information for a subscriber group, determine at least one network function instance for the subscriber group, according to the information for the subscriber group and the second network node's storage, and send a first response comprising the at least one network function instance for the subscriber group.

In some embodiments, the apparatus is further operative to: receive a second request for querying subscriber group information of a plurality of subscriber group, and send a second response comprising the subscriber group information of the plurality of subscriber group.

In some embodiments, the apparatus is further operative to receive registration of a network function instance and information identifying a subscriber group to which the network function instance is applicable via a third party registration entity.

In a sixth aspect of the disclosure, there is provided an apparatus in a third network node in a wireless core network with service based architecture. The apparatus may comprise a processor and a memory coupled to the processor. The memory may contain instructions executable by the processor, whereby the apparatus is operative to send a registration request for network function instance to a second network node, the registration request comprising information identifying a subscriber group to which the network function instance is applicable, wherein the second network node is a network function repository.

In a seventh aspect of the present disclosure, there is provided an apparatus in a first network node in a wireless core network with service based architecture. The apparatus may comprise: a first determining unit configured to determine, in response to trigger of network function selection by a terminal device of the wireless core network, at least one subscriber group that a terminal device of the wireless core network is matched with; a retrieving unit configured to retrieve at least one network function instance for the at least one subscriber group; and a storing unit configured to store the at least one network function instance in association with the at least one subscriber group.

In an eighth aspect of the present disclosure, there is provided an apparatus in a second network node in a wireless core network with service based architecture. The apparatus may comprise: a third receiving unit configured to receive a registration request for network function instance from a network function, the registration request comprising information identifying a subscriber group to which the network function instance is applicable; and a storing unit configured to store the information in association with the network function instance.

In a ninth aspect of the present disclosure, there is provided an apparatus in a third network node in a wireless core network with service based architecture. The apparatus may comprise a registering unit configured to register by sending a registration request for network function instance to a second network node, the registration request comprising information identifying a subscriber group to which the network function instance is applicable, wherein the second network node is a network function repository.

In a tenth aspect of the disclosure, there is provided an apparatus in a first network node. The apparatus may comprise process means adapted to perform any method in accordance with the first aspect of the disclosure.

In an eleventh aspect of the disclosure, there is provided an apparatus in a second network node. The apparatus may comprise process means adapted to perform any method in accordance with the second aspect of the disclosure.

In a twelfth aspect of the disclosure, there is provided an apparatus in a third network node. The apparatus may comprise process means adapted to perform any method in accordance with the third aspect of the disclosure.

In a thirteenth aspect of the disclosure, there is provided a computer program, comprising instructions which, when executed on at least one processor, cause the at least one processor to carry out the method according to the first aspect of the disclosure.

In a fourteenth aspect of the disclosure, there is provided a computer program, comprising instructions which, when executed on at least one processor, cause the at least one processor to carry out the method according to the second aspect of the disclosure.

In a fifteenth aspect of the disclosure, there is provided a computer program, comprising instructions which, when executed on at least one processor, cause the at least one processor to carry out the method according to the second aspect of the disclosure.

According to the various aspects and embodiments as mentioned above, NF service discovery can be based on the subscriber group identifier, and the discovery result can be reusable and cacheable.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
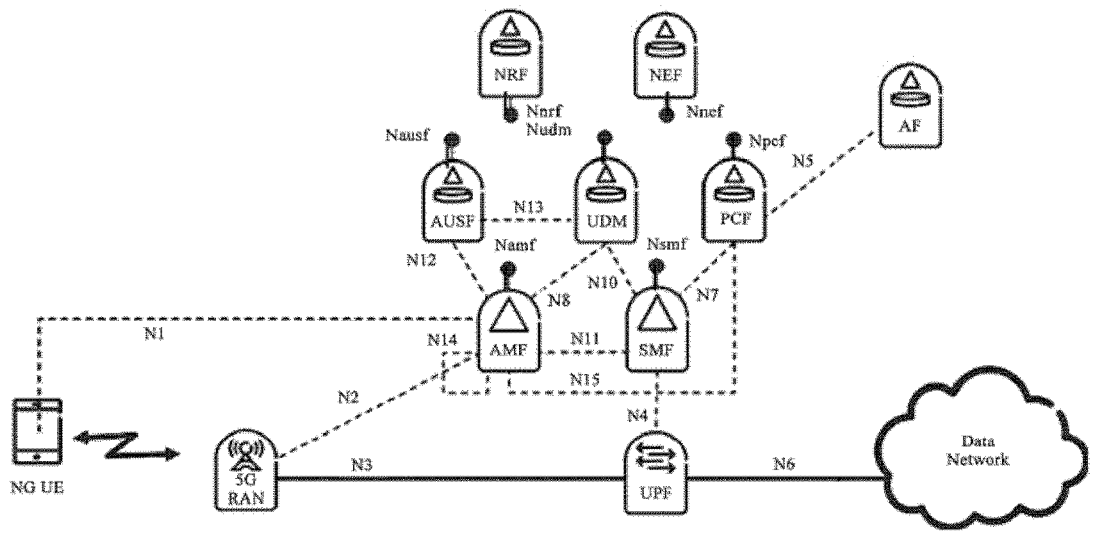
FIG. 1 illustrates a schematic 5G core network with SBA.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "terminal device" used herein may refer to any terminal device or user equipment (UE) having wireless communication capabilities, including but not limited to, mobile phones, cellular phones, smart phones, or personal digital assistants (PDAs), portable computers, image capture devices such as digital cameras, gaming devices, music storage and playback appliances, wearable devices, vehicle-mounted wireless device and the like. In the following description, the terms "terminal device", "user equipment" and "UE" may be used interchangeably. Similarly, the term "network node" may represent any NF in 5G core network.

For illustrative purposes, several embodiments of the present disclosure will be described in the context of a 5G core network. Those skilled in the art will appreciate, however, that the concept and principle of the several embodiments of the present disclosure may be more generally applicable to other wireless core networks with SBA.

The non-limiting and exemplary embodiments of the present disclosure relate to NF service discovery.

In 5G core network as shown in FIG. 1, a NF may provide many NF services and a NF may request a certain NF service. In this case, the requesting NF may be referred to as "NF service consumer", and the NF providing the NF service may be referred to as "NF service producer". As described above, the NF services provided by the NF service producers may be registered in the NRF.

3GPP requires that multiple UDM instances serving dedicated subscriber groups may be employed within one PLMN. Hence it shall be possible to discover and select the UDM instance based on a subscriber identifier of a terminal device. In 5G network, each terminal device shall be allocated with a globally unique 5G Subscriber Permanent Identifier (SUPI). The SUPI may have two types: International Mobile Subscriber Identity (IMSI) as defined in TS 23.003 and Network Access Identifier (NAI) using the NAI RFC 4282 based user identification as defined in TS23.003.

Currently the NF service consumer performs the NF selection based on the subscriber identifier of the terminal device in the NF service discovery procedure. However using the subscriber identifier of the terminal device in the NF service discovery would make the discovery result unique per individual terminal device. Also the discovery result is not reusable when the NF service consumer performs the NF selection for other terminal device. Thus the overall network signaling load would be increased.

In addition, when the NF service consumer performs the NF service discovery, the NRF will always keep a complete list of NF services for every single subscriber identifier. This would increase the load of the NRF.

Considering the case where the UDM instances are deployed to the dedicated subscriber groups, when the UDM performs UDM service registration with the NRF, the UDM will indicate to the NRF which subscriber group the UDM instance will serve. When the AMF uses the SUPI of the terminal device to perform the NF service discovery for the UDM service, the NRF has to compute and find out which subscriber group the SUPI belongs to. This would increase the complexity in the NRF implementation.

On the other hand, the subscriber group may be configured locally in the NF service consumer. Hence only static NF instance information of the NF service producer can be supported. The NF service consumer cannot consider the dynamic NF instance information during the NF service discovery.

Therefore it is desirable to provide a new mechanism for NF service discovery to overcome the above mentioned problems.

In the present disclosure, methods, apparatuses and computer program products are provided to support NF service discovery in the wireless core network with SBA. Though embodiments of the present disclosure can be implemented in the exemplary 5G core network shown in FIG. 1, it would be appreciated that embodiments of the disclosure are not limited to such a core network.

Figure 2:
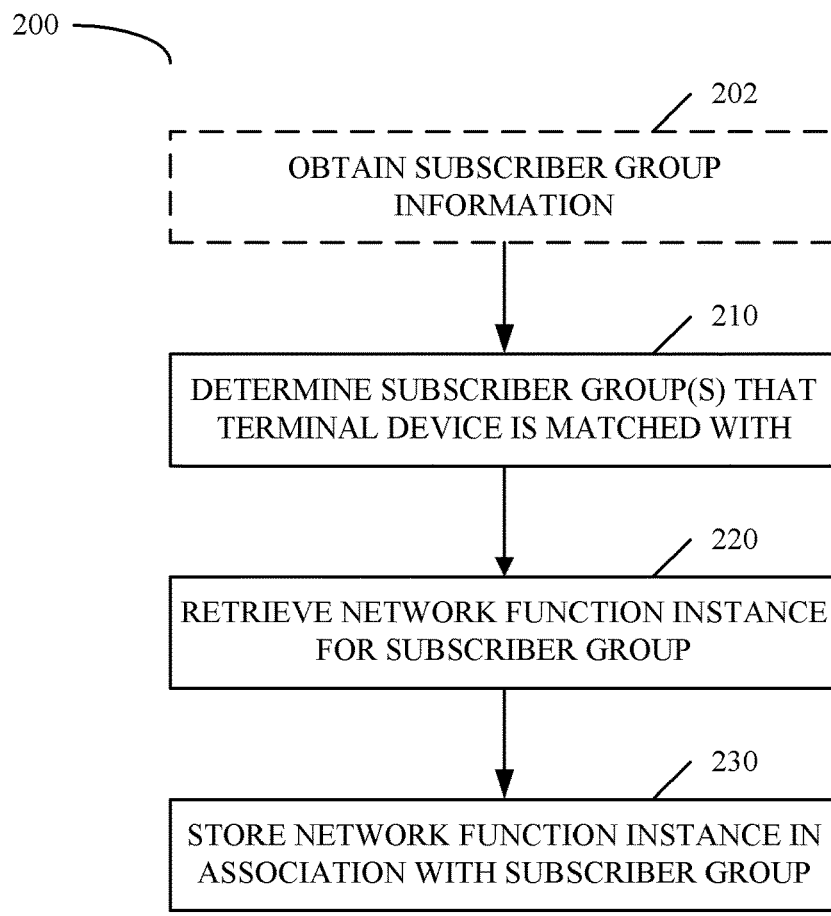
FIG. 2 illustrates a flowchart of a method implemented at a first network node in a wireless core network with service based architecture according to an embodiment of the present disclosure.

Reference is now made to FIG. 2, which shows a flowchart of a method 200 according to an embodiment of the present disclosure. The method 200 may be implemented at a first network node (e.g., a NF service consumer like the AMF shown in FIG. 1).

As shown in FIG. 2, the method 200 may comprise: determining at least one subscriber group that the terminal device is matched with at block 210; retrieving at least one network function instance for the at least one subscriber group at block 220; and storing the at least one network function instance in association with the at least one subscriber group at block 230.

In an embodiment, at block 210, the NF service consumer may determine, in response to trigger of the NF selection for the terminal device (e.g. NG UE as shown in FIG. 1), which subscriber group(s) the terminal device is matched with. For example, when the terminal device attaches to a wireless network, or the terminal device originates traffic, or the terminal device terminates traffic, etc. the NF selection may be triggered for this terminal device. When an SMS (Short Message Service) message is sent to unattached terminal device and cached in the network, NF selection procedure can be invoked. When an SMS message is delivered to a terminal device once it is attached in the network, NF selection procedure can be invoked. At this time, the NF service consumer performing the NF selection may determine which subscriber group(s) the terminal device is matched with. The NF service consumer may make the determination based on subscriber group information of a plurality of subscriber groups and information provided by the terminal device. The subscriber group information of the subscriber groups may be stored in the NF service consumer.

In some embodiments, the NF service consumer may obtain the subscriber group information of the subscriber groups in advance at block 202. As described above, the NF service producer may register its NF services with the NRF. The NRF may maintain the NF profile for each NF instance. During the NF service registration, the NF service producer may inform the NRF which subscriber group(s) the NF instance can serve. The NRF may store the subscriber group information of the subscriber group(s) in the NF profile of the NF instance. In an embodiment, the NF service consumer may obtain the subscriber group information from the NRF. The NF service consumer may send a request for querying the subscriber group information to the NRF. For example, the request may be a HTTP request like GET. Then the NF service consumer may receive a response comprising the subscriber group information from the NRF.

In some embodiments, the subscriber group information may comprise a subscriber group identifier of the subscriber group. The subscriber group identifier may be formed in various ways.

In an embodiment, the subscriber group identifier may be represented by one or more IMSI range. As described above, the subscriber identifier of the terminal device may be IMSI. Hence it is possible to use one or more IMSI ranges to represent a subscriber group.

Alternatively, in an embodiment, the subscriber group identifier may be represented by a portion of NAI. As described above, the subscriber identifier of the terminal device may be NAI. Generally, the NAI may be in the form of "Username@Domain". Hence the portion of "Username" or "Domain" may be used as the subscriber group identifier. In this case, the subscriber group may comprise a number of terminal devices with the same "Username" or "Domain". Alternatively, a part of the portion of "Username" or "Domain" may be used as the subscriber group identifier.

Alternatively, in an embodiment, the subscriber group identifier may be represented by a part or whole of network slice selection information, such as NSSAI (Network Slice Selection Assistance Information). The terminal device may provide the NSSAI to select a certain network slice. Hence the NSSAI may be used to identify a number of terminal devices.

Alternatively, in an embodiment, the subscriber group identifier may be mapped to one or more IMSI ranges, or a portion of NAI, or a part or whole of the NSSAI.

In some embodiments, the subscriber group information may be a policy of deriving a subscriber group identifier. The policy may indicate how the subscriber group identifier can be derived from the information of the terminal device, e.g. the subscriber identifier of the terminal device or the network slice selection information provided by the terminal device.

In some embodiments, the subscriber group identifier may be specific to a NF. In an embodiment, the subscriber group identifier may be specific to the NF service producer. That is, different NF service producers may have different forms of subscriber group identifier. For example, UDM may have the subscriber group identifier in the form of IMSI range, and SMF may have the subscriber group identifier in the form of a part of NSSAI. Alternatively or additionally, the subscriber group identifier may be specific to the NF service consumer. For example, only specific subscriber group identifier may be used by the NF service consumer.

In some embodiments, the NF service consumer may obtain the subscriber group information by receiving the subscriber group information from another NF service consumer that has cached the subscriber group information. For example, when the terminal device reattaches to new AMF, the new AMF may be received the subscriber group information from the old AMF.

Back to the block 210, the NF service consumer may determine the subscriber group(s) that the terminal device is matched with. In some embodiments, the NF service consumer may obtain the subscriber identifier of the terminal device and/or the network slice selection information provided by the terminal device. Then the NF service consumer may compare the subscriber identifier and/or the network slice selection information with the subscriber group identifiers of the subscriber groups. If any subscriber group identifier is a part of the subscriber identifier and/or a part of the network slice selection information provided by the terminal device, it is determined that the terminal device belongs to the subscriber group having the subscriber group identifier. It should be noted that in this case, the NF service consumer has obtained the subscriber group identifiers of the subscriber groups.

In some embodiments, the NF service consumer may obtain the subscriber identifier of the terminal device and/or the network slice selection information provided by the terminal device. Then the NF service consumer may derive the subscriber group identifier from the subscriber identifier and/or the network slice selection information. It should be noted that in this case, the NF service consumer has obtained the policy of deriving the subscriber group identifier.

Then at block 220, the NF service consumer may retrieve at least one network function instance corresponding to the matched subscriber group(s). In some embodiments, the NF service consumer may send a request for discovering the NF instance to the NRF. The request may comprise the subscriber group identifier(s) of the matched subscriber group(s). The NRF may discover the NF instance(s) based on the subscriber group identifier(s). Then the NRF may send a response including the discovered NF instance(s) to the NF service consumer.

Then at block 230, the NF service consumer may store the received NF instance(s) in association with the subscriber group identifier(s). Thus the stored NF instances are reusable for the terminal devices belonging to the corresponding subscriber group. In some embodiments, the NF service consumer may store the NF instance(s) for a certain period. After the period expires, the NF service consumer should retrieve the NF instance again. In this way, the NF service consumer can update the stored NF instances. Then the NF service consumer may proceed with requesting the NF service with the NF service producer.

Figure 3:
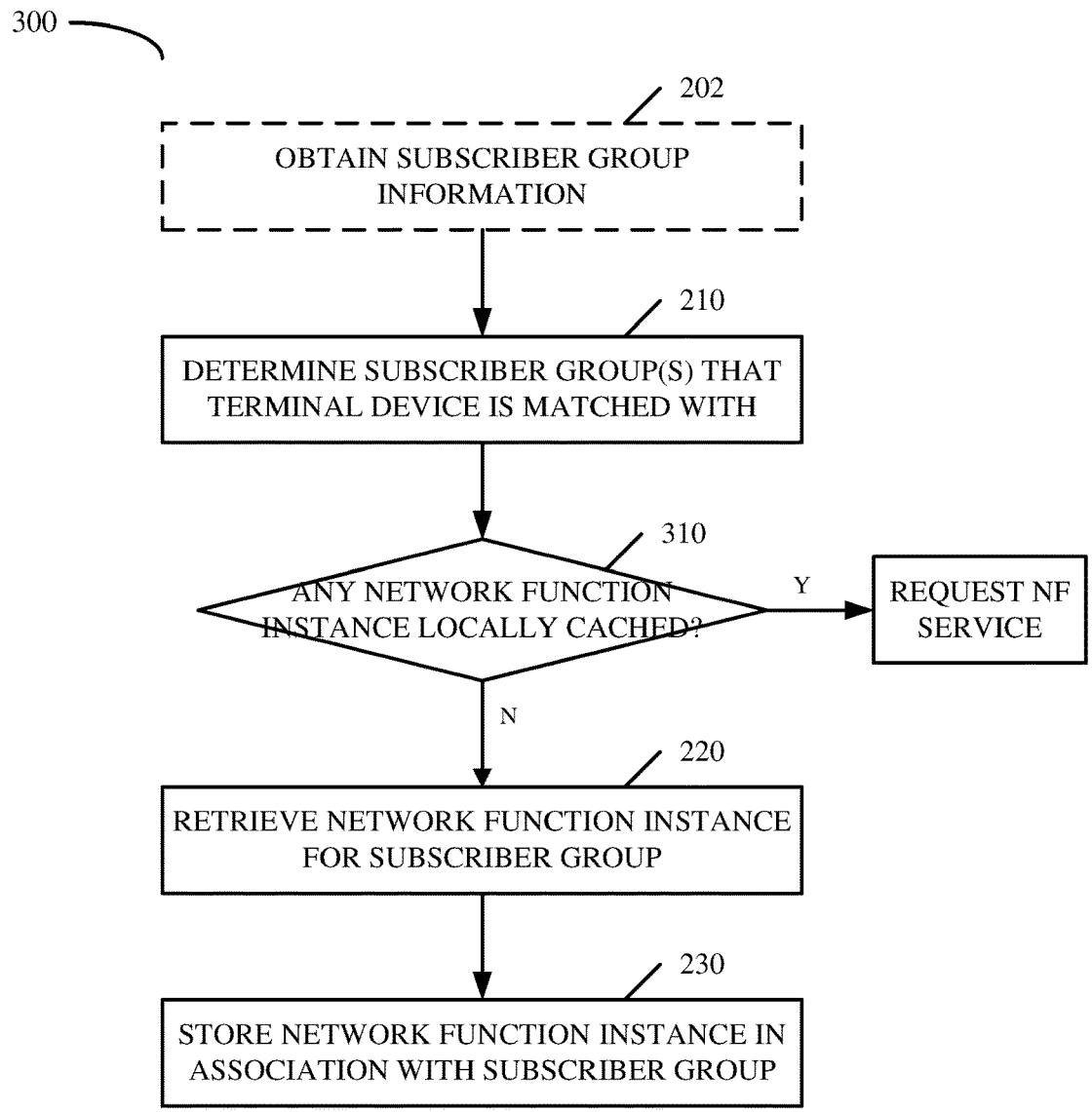
FIG. 3 illustrates a flowchart of a method implemented at a first network node in a wireless core network with service based architecture according to another embodiment of the present disclosure.

FIG. 3 illustrates a flowchart of a method 300 implemented at the first network node according to another embodiment of the present disclosure. In the method 300, after determining the subscriber group(s) that the terminal device is matched with at block 210, at block 310, the NF service consumer may check whether any NF instance has been cached locally for the matched subscriber group(s). If the NF instances for the matched subscriber group(s) have been cached locally, there is no need for the NF service consumer to perform the operations at blocks 220, 230. If no NF instance for the matched subscriber group(s) has been cached locally, the NF service consumer may perform the operations at blocks 220, 230.

Figure 4:
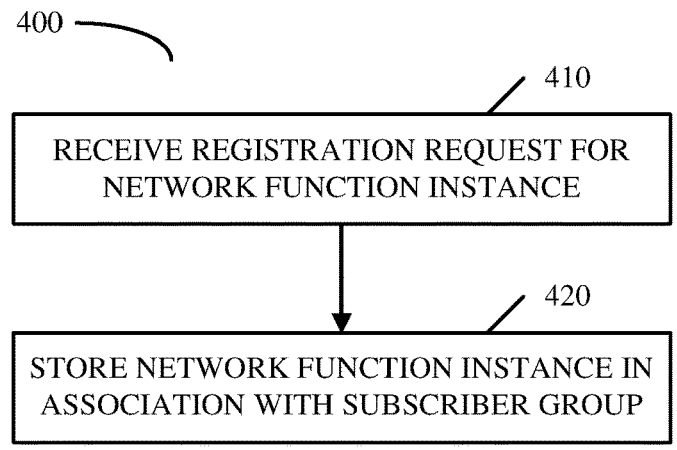
FIG. 4 illustrate a flowchart of a method implemented at a second network node in a wireless core network with service based architecture according to an embodiment of the present disclosure.

Reference is now made to FIG. 4, which shows a flowchart of a method 400 according to an embodiment of the present disclosure. The method 400 may be implemented at a second network node (e.g., a NF repository like the NRF shown in FIG. 1).

As shown in FIG. 4, the method 400 may comprise: receiving a registration request for network function instance from a network function service producer at block 410, the registration request including a subscriber group identifier of a subscriber group to which the network function instance is applicable; and storing the subscriber group identifier in association with the network function instance at block 420.

As described above, the NF instances are registered in the NRF, and the NRF maintains the NF profile for the NF instance. The NF registration may be triggered by the NF service producer or via a third party registration entity.

At block 410, the NF repository may receive a registration request for a NF instance from the NF service producer. The registration request may comprise a subscriber group identifier of a subscriber group to which the NF instance is applicable. Then at block 420, the NF repository may store the NF instance in association with the subscriber group identifier. In an embodiment, the NF repository may store the subscriber group identifier in the NF profile for the NF instance.

Alternatively or additionally, in some embodiments, the NF repository may receive registration of a NF instance and a subscriber group identifier of a subscriber group to which the NF instance is applicable via a third party registration entity. For example, the third party registration entity may be an OAM (Operation and Management) function.

In some embodiments, the subscriber group identifier may be represented by one of at least one IMSI range, a portion of NAI, and a part or whole of network slice selection information. Alternatively, the subscriber group identifier may be mapped to at least one IMSI range or a portion of NAI or a part or whole of network slice selection information.

With the embodiments described above, since information for the subscriber group, other than each of an entire subscriber identifier in the subscriber group, is registered associated with the network instance, size of NF profile can be saved. Further, signaling on the interfaces between the NFR and the register requester can be reduced.

Figure 5:
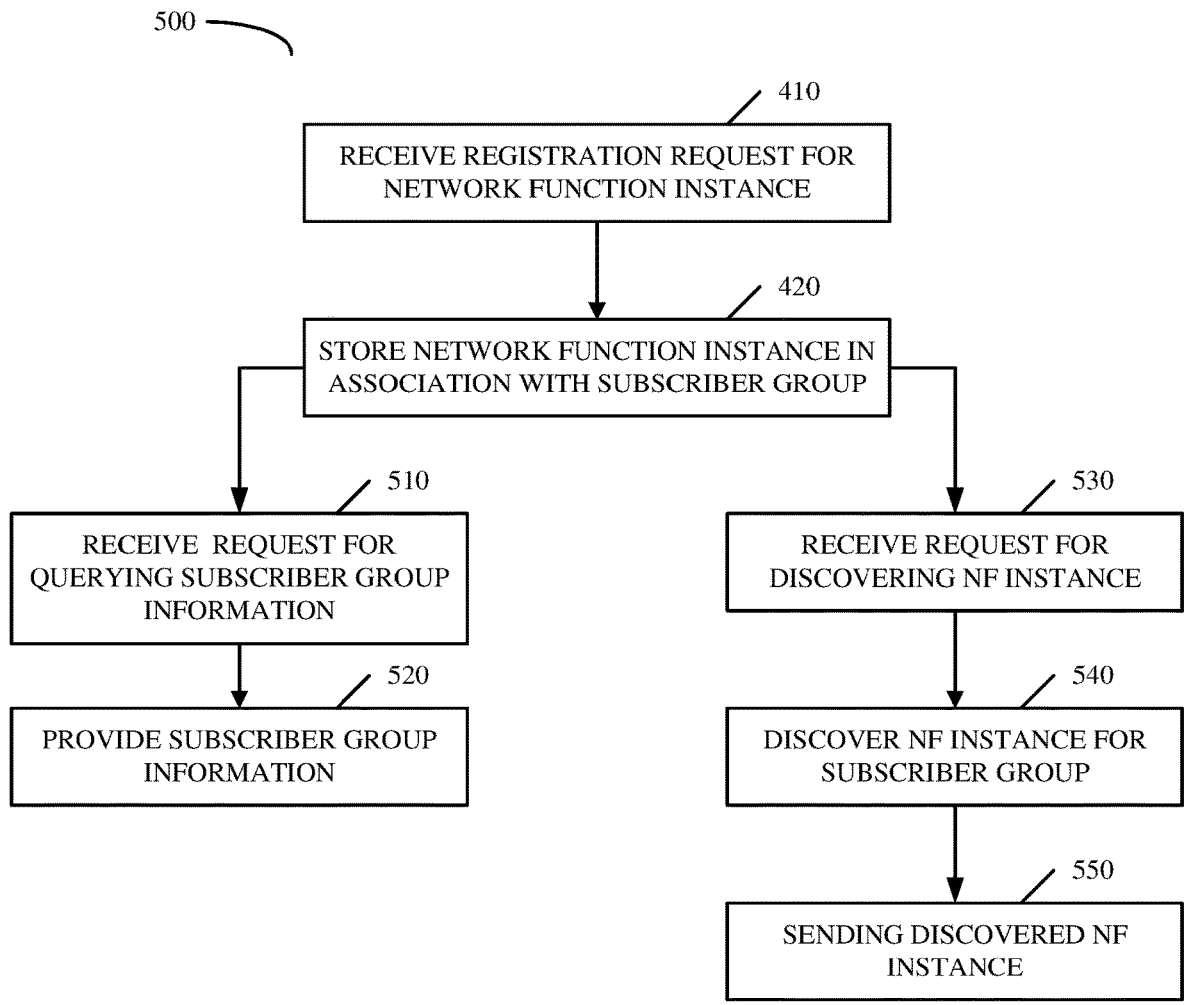
FIG. 5 illustrates a flowchart of a method implemented at a second network node in a wireless core network with service based architecture according to another embodiment of the present disclosure.

FIG. 5 illustrates a flow of a method 500 implemented at the second network node according to another embodiment of the present disclosure. As shown in FIG. 5, the NF repository may further provide the subscriber group information of the subscriber group to the NF service consumer and perform NF service discovery with the NF service consumer.

At block 510, the NF repository may receive a request for querying the subscriber group information from the NF service consumer. In some embodiments, the request may be a HTTP request, e.g. GET. Then the NF repository, in response to the request, provide the subscriber group information including the subscriber group identifiers and/or the policy of deriving the subscriber group identifier to the NF service consumer, at block 520.

In parallel, the NF repository may receive a request for discovering NF instance from the NF service consumer, at block 530. The request may include the subscriber group identifier of the subscriber group. Then the NF repository may discover one or more NF instances according to the subscriber group identifier at block 540. As described above, the NF repository may store the subscriber group identifier in the NF profile for the NF instance. Then at block 550, the NF repository may send the discovered NF instances as a response to the NF service consumer.

Figure 6:
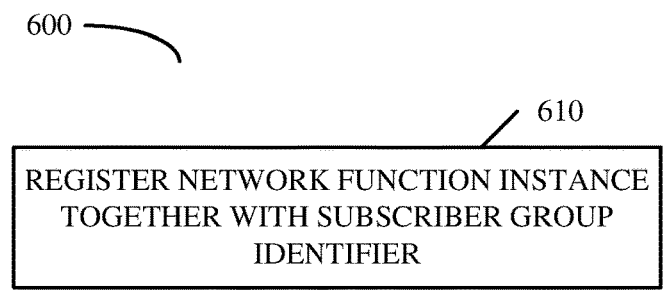
FIG. 6 illustrate a flowchart of method implemented at a third network node in a wireless core network with service based architecture according to an embodiment of the present disclosure.

Reference is now made to FIG. 6, which shows a flowchart of a method 600 according to an embodiment of the present disclosure. The method 600 may be implemented at a third network node (e.g., a NF service producer like the UDM, SMF, AUSF, PCF, etc. shown in FIG. 1).

As shown in FIG. 6, at block 610, the NF service producer may register with the NF repository a NF instance together with a subscriber group identifier of a subscriber group to which the NF instance is applicable. In this way, the NF service producer can inform the NF repository the subscriber group its NF instance will serve.

With the embodiments of the present disclosure as described above, the NF service discovery can be performed based on the subscriber group identifier of the subscriber group. Compared with using the subscriber identifier of the terminal device to perform the NF service discovery, using the subscriber group identifier can make the discovery result reusable/cacheable for the NF service consumer, thereby reducing the overall network signaling load. Moreover, it allows for dynamic information of the NF service producers to be discovered.

Figure 7:
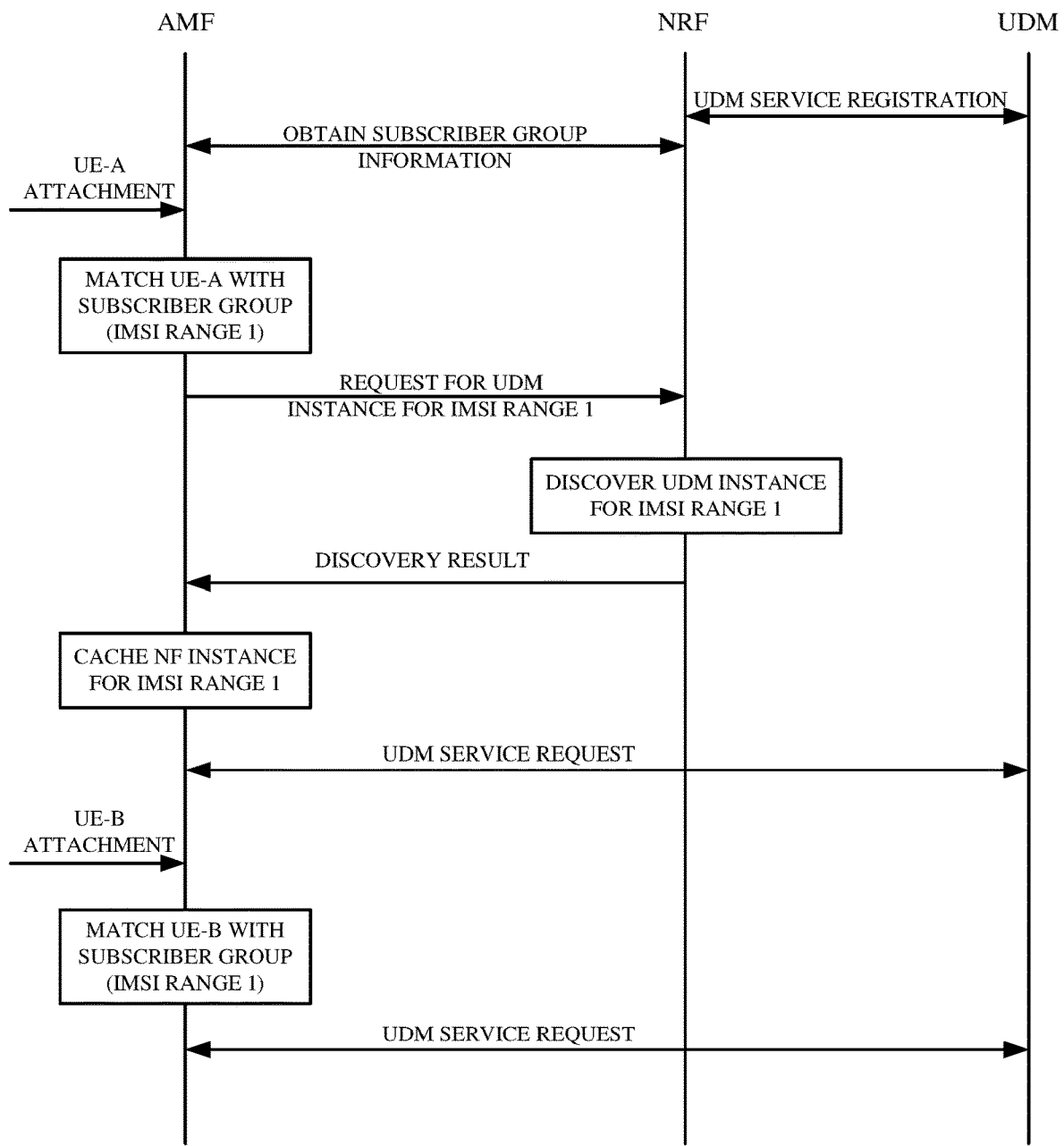
FIG. 7 illustrates an exemplary flow of network function service discovery according to embodiments of the present disclosure.

FIG. 7 illustrates an exemplary flow of the NF service discovery according to the embodiments of the present disclosure. In this example, it takes AMF as an example of the NF service consumer, UDM as an example of the NF service producer, and NRF as an example of the NF repository.

As shown in FIG. 7, the AMF may obtain the subscriber group information from the NRF. This procedure may be performed as described in connection with block 202 of FIG. 2 and blocks 510, 520 of FIG. 5. On the other hand, the UDM may register its UDM instances together with the subscriber group identifier(s) of the subscriber group(s) to which the UDM instances serve with the NRF. This procedure may be performed as described in connection with block 410 of FIG. 4 and block 610 of FIG. 6. Assume that the subscriber group identifier is represented by the IMSI range.

When UE-A (with the IMSI as 341000123456789) attaches to the core network, the AMF may determine UE-A is matched with a subscriber group with the IMSI range 1 as 341000123. The AMF checks there is no local cache of UDM instance serving the subscriber group.

Then the AMF triggers the NF service discovery procedure using the IMSI range 1 of 341000123. The AMF may send a request for discovering UDM instance to the NRF. The request includes the IMSI range 1. Then the NRF discovers the UDM instances corresponding to the IMSI range 1 and send the discovered UDM instances to the AMF.

The AMF may store the received UDM instances in association with the subscriber group with the IMSI range 1 in its local storage. Then AMF may continue with subsequent operation, e.g. requesting UDM service.

When UE-B (with the IMSI as 34100123456788) attaches in the core network, the AMF may determine that the UE-B is matched with the subscriber group with the IMSI range 1. Then the AMF check that there is a local cache of the UDM instances serving the subscriber group. Then the AMF may skip the NF service discovery procedure and continue with the subsequent operation, e.g. requesting UDM service.

Figure 8A:
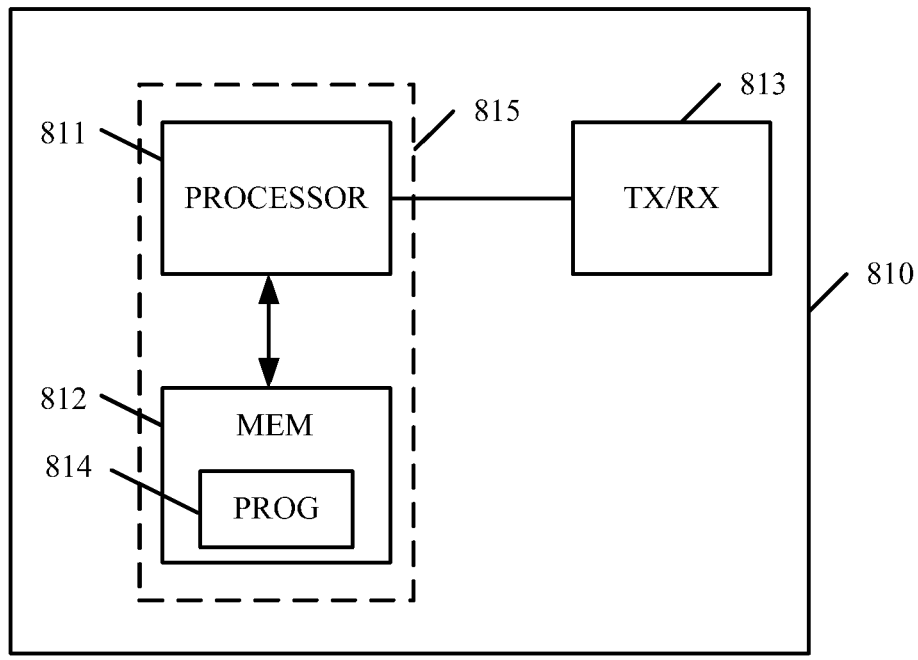
FIGS. 8a-8c illustrate simplified block diagrams of an apparatus in a first network node, a second network node and a third network node, respectively, according to an embodiment of the present disclosure.
Figure 8B:
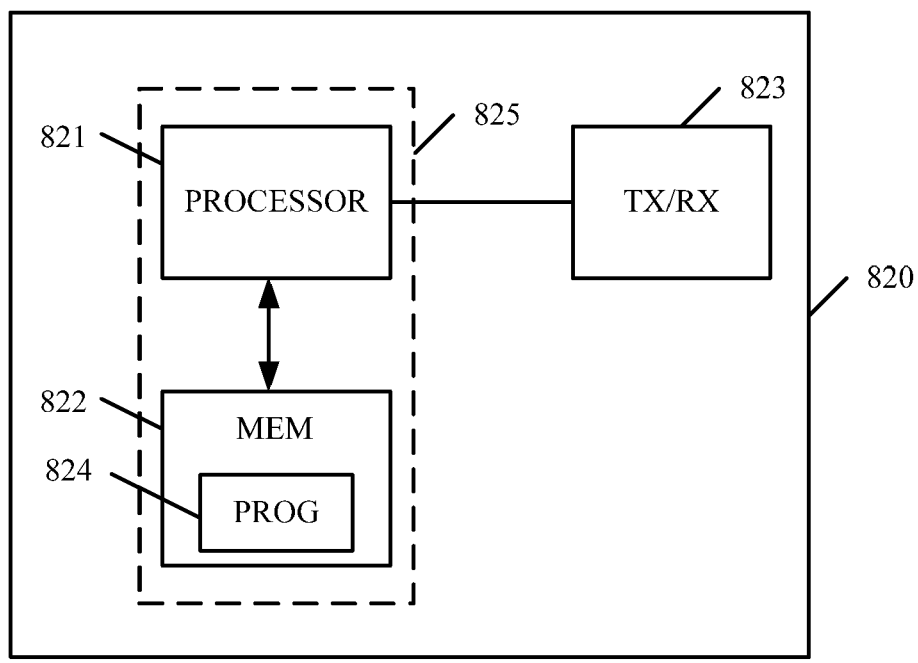
Figure 8C:
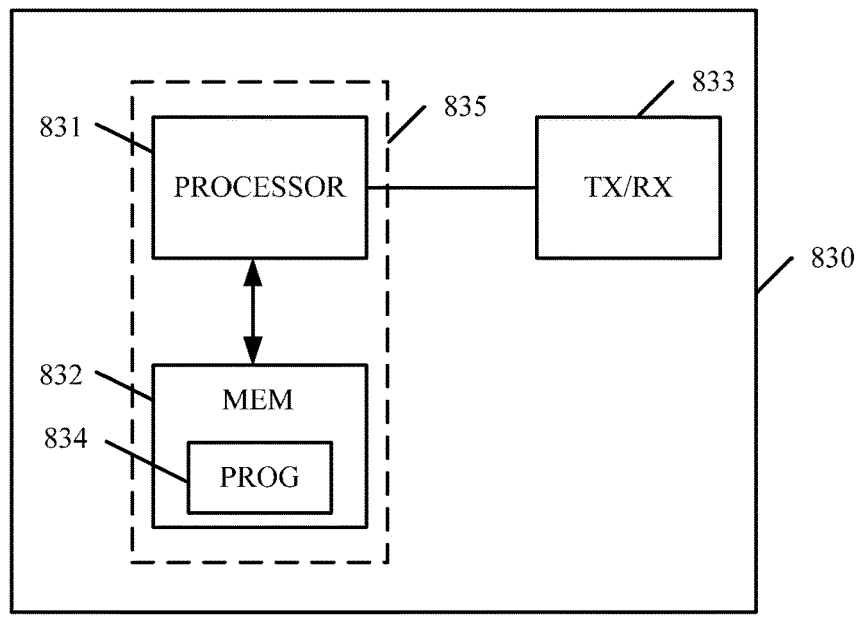

FIG. 8a illustrates a simplified block diagram of an apparatus 810 that may be embodied in/as a first network node, e.g., the NF service consumer like the AMF shown in FIG. 1. FIG. 8b illustrates an apparatus 820 that may be embodied in/as a second network node, e.g., the NF repository like NRF shown in FIG. 1. FIG. 8c shows an apparatus 830 that may be embodied in/as a third network node, e.g., the NF service producer like the UDM, SMF, AUSF, etc. shown in FIG. 1.

The apparatus 810 may comprise at least one processor 811, such as a data processor (DP) and at least one memory (MEM) 812 coupled to the processor 811. The apparatus 810 may further comprise a transmitter TX and receiver RX 813 coupled to the processor 811. The MEM 812 stores a program (PROG) 814. The PROG 814 may include instructions that, when executed on the associated processor 811, enable the apparatus 810 to operate in accordance with the embodiments of the present disclosure, for example to perform the methods 200, 300. A combination of the at least one processor 811 and the at least one MEM 812 may form processing means 815 adapted to implement various embodiments of the present disclosure.

The apparatus 820 comprises at least one processor 821, such as a DP, and at least one MEM 822 coupled to the processor 821. The apparatus 820 may further comprise a transmitter TX and receiver RX 823 coupled to the processor 821. The MEM 822 stores a PROG 824. The PROG 824 may include instructions that, when executed on the associated processor 821, enable the apparatus 820 to operate in accordance with the embodiments of the present disclosure, for example to perform the methods 400, 500. A combination of the at least one processor 821 and the at least one MEM 822 may form processing means 825 adapted to implement various embodiments of the present disclosure.

The apparatus 830 comprises at least one processor 831, such as a DP, and at least one MEM 832 coupled to the processor 831. The apparatus 830 may further comprise a transmitter TX and receiver RX 833 coupled to the processor 831. The MEM 832 stores a PROG 834. The PROG 834 may include instructions that, when executed on the associated processor 821, enable the apparatus 830 to operate in accordance with the embodiments of the present disclosure, for example to perform the method 600. A combination of the at least one processor 831 and the at least one MEM 832 may form processing means 835 adapted to implement various embodiments of the present disclosure.

Various embodiments of the present disclosure may be implemented by computer program executable by one or more of the processors 811, 821 and 831, software, firmware, hardware or in a combination thereof.

The MEMs 812, 822 and 832 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 811, 821 and 831 may be of any type suitable to the local technical environment, and may include one or more of general purpose computers, special purpose computers, microprocessors, digital signal processors DSPs and processors based on multicore processor architecture, as non-limiting examples.

Figure 9:
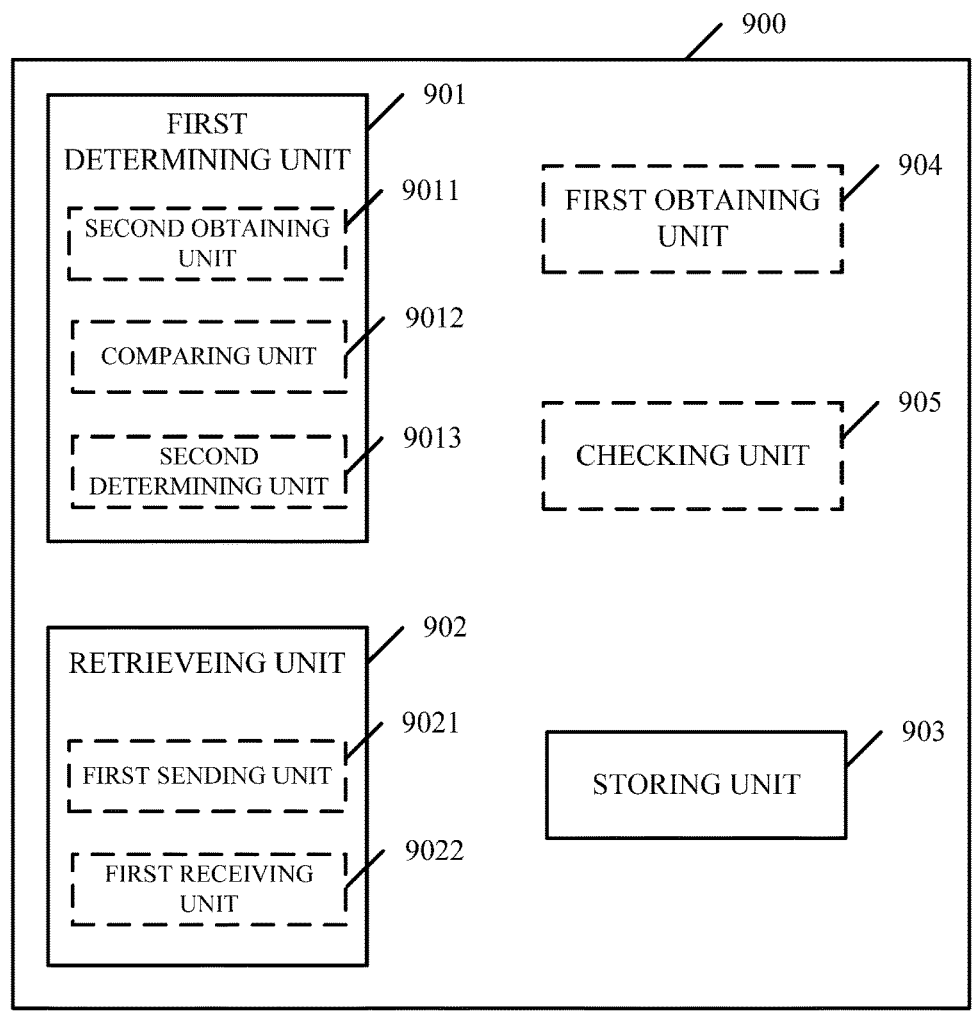
FIG. 9 illustrates a simplified block diagram of an apparatus in a first network node according to an embodiment of the present disclosure.

Reference is now made to FIG. 9, which illustrates a schematic block diagram of an apparatus 900 in a first network node in a wireless core network with SBA. The first network node may be, for example, the NF service consumer like the AMF shown in FIG. 1. The apparatus 900 is operable to carry out the exemplary methods 200, 300 described with reference to FIGS. 2-3 and possibly any other processes or methods.

As shown in FIG. 9, the apparatus 900 may comprise: a first determining unit 901 configured to determine, in response to trigger of network function selection by a terminal device of the wireless core network, at least one subscriber group that a terminal device of the wireless core network is matched with; a retrieving unit 902 configured to retrieve at least one network function instance for the at least one subscriber group; and a storing unit 903 configured to store the at least one network function instance in association with the at least one subscriber group.

In some embodiment, the apparatus 900 may further comprise a first obtaining unit 904 configured to obtain subscriber group information of a plurality of subscriber groups. In an embodiment, the subscriber group information may comprise a subscriber group identifier and/or a policy of deriving a subscriber group identifier.

In some embodiments, the first determining unit 901 may comprise a second obtaining unit 9011 configured to obtain a subscriber identifier of the terminal device and/or network slice selection information provided by the terminal device; a comparing unit 9012 configured to comparing the subscriber identifier of the terminal device and/or the network slice selection information with subscriber group identifiers of a plurality of subscriber groups; and a second determining unit 9013 configured to determine, in response to the subscriber group identifier being a part of the subscriber identifier and/or a part of the network slice selection information, the terminal device is matched with the subscriber group having the subscriber group identifier.

In some embodiments, the first determining unit 901 may comprise a second obtaining unit configured to obtain a subscriber identifier of the terminal device and/or network slice selection information provided by the terminal device; and a deriving unit configured to derive at least one subscriber group identifier from the subscriber identifier and/or the network slice selection information.

In some embodiments, the retrieving unit 902 may comprise a first sending unit 9021 configured to send a first request for discovering network function instance, the first request comprising a subscriber group identifier of the at least one subscriber group; and a first receiving unit 9022 configured to receive a first response comprising at least one network function instance for the subscriber group.

In some embodiments, the apparatus 900 may further comprise a checking unit 905 configured to check whether any network function instance has been cached locally for the subscriber group that the terminal device is matched with. In an embodiment, the retrieving unit 902 may be configured to retrieve the NF instance in response to no network function instance being cached locally for the subscriber group.

In some embodiments, the first obtaining unit 904 may comprise a second sending unit configured to send a second request for querying subscriber group information of a plurality of subscriber groups; and a second receiving unit configured to receiving a second response comprising the subscriber group information. In an embodiment, the first obtaining unit 904 may be configured to receive the subscriber group information from another first network node.

In some embodiments, the units of the apparatus 900 may be configured to implement the operations of corresponding blocks of the methods 200, 300, and therefore relevant descriptions provided with reference to methods 200, 300 also apply here and thus details will not be repeated.

Figure 10:
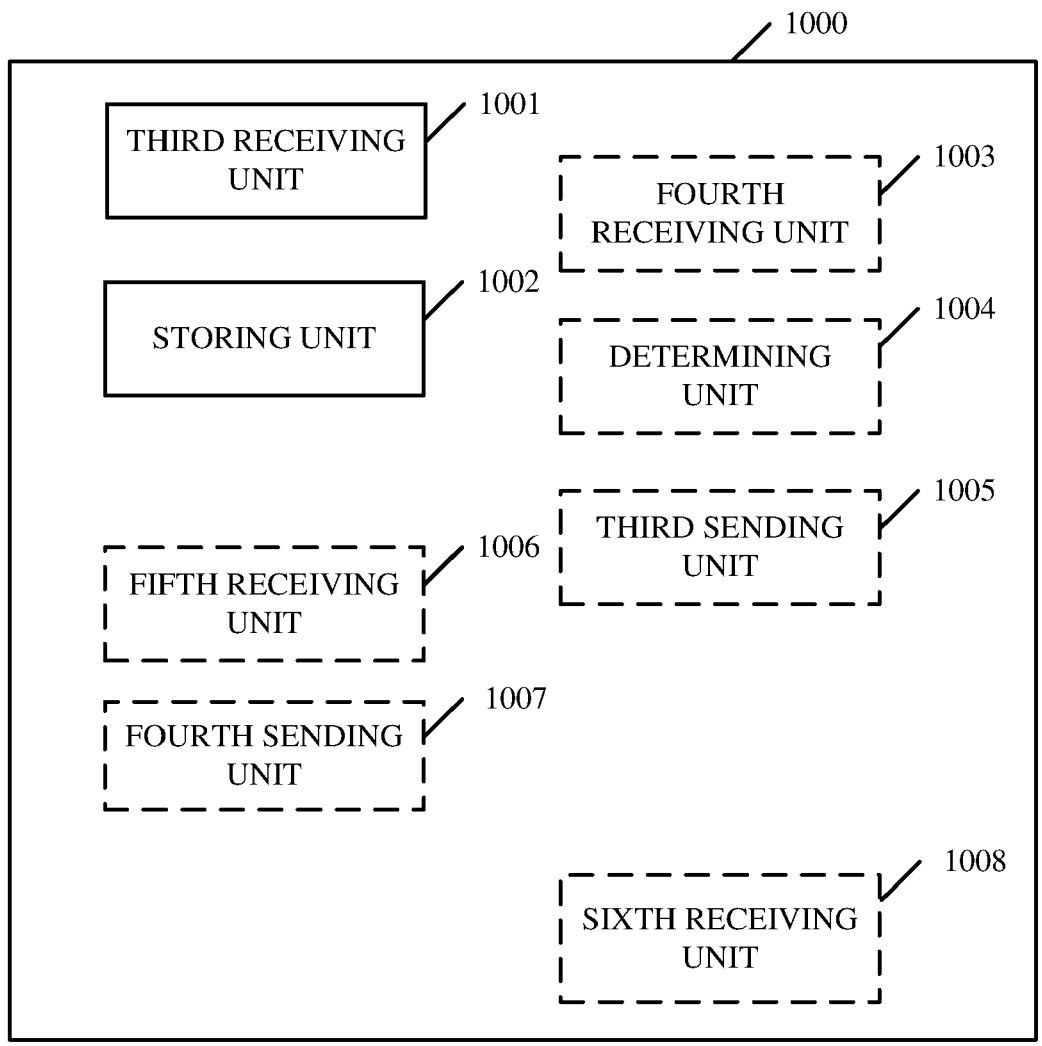
FIG. 10 illustrates a simplified block diagram of an apparatus in a second network node according to an embodiment of the present disclosure.

Reference is now made to FIG. 10, which illustrates a schematic block diagram of an apparatus 1000 in a second network node in a wireless core network with SBA. The second network node may be, for example, the NRF shown in FIG. 1. The apparatus 1000 is operable to carry out the exemplary methods 400, 500 described with reference to FIGS. 4-5 and possibly any other processes or methods.

As illustrated in FIG. 10, the apparatus 1000 may comprises a third receiving unit 1001 configured to receive a registration request for network function instance from a network function service producer, the registration request including a subscriber group identifier of a subscriber group to which the network function instance is applicable; and a storing unit 1002 configured to store the subscriber group identifier in association with the network function instance.

In some embodiments, the apparatus 1000 may further comprise a fourth receiving unit 1003 configured to receive a first request for discovering network function instance, the first request comprising a subscriber group identifier of a subscriber group; a determining unit 1004 configured to determine at least one network function instance for the subscriber group, according to the subscriber group identifier; and a third sending unit 1005 configured to send a first response comprising the at least one network function instance for the subscriber group.

In some embodiments, the apparatus 1000 may further comprise a fifth receiving unit 1006 configured to receive a second request for querying subscriber group information of a plurality of subscriber group; and a fourth sending unit 1007 configured to send a second response comprising the subscriber group information of the plurality of subscriber group.

In some embodiments, the apparatus 1000 may further comprise a sixth receiving unit 1008 configured to receive registration of a network function instance and a subscriber group identifier of a subscriber group to which the network function instance is applicable via a third party registration entity.

In some embodiments, the units of the apparatus 1000 may be configured to implement the operations of corresponding blocks of the methods 400, 500, and therefore relevant descriptions provided with reference to methods 400, 500 also apply here and thus details will not be repeated.

Figure 11:
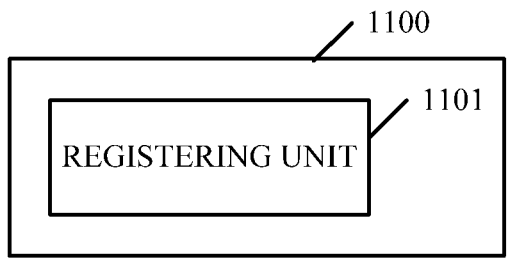
FIG. 11 illustrates a simplified block diagram of an apparatus in a third network node according to an embodiment of the present disclosure.

Reference is now made to FIG. 11, which illustrates a schematic block diagram of an apparatus 1100 in a third network node in a wireless core network with SBA. The third network node may be, for example, the NF service producer, like the UDM, AUSF, PCF, etc. shown in FIG. 1.

The apparatus 1100 is operable to carry out the method 600 described with reference to FIG. 6 and possibly any other processes or methods.

As shown in FIG. 11, the apparatus 1100 may comprise a registering unit 1101 configured to register, with a network function repository, a network function instance together with a subscriber group identifier of a subscriber group to which the network function instance is applicable.

It would be appreciated that, some units or modules in the apparatus 900, 1000 or 1100 can be combined in some implementations. For example, in one embodiment, it is possible to use a single transceiving unit to send and receive all the information transmitted by the units 1001, 1003, 1005-1008 described with reference to FIG. 10.

Although some embodiments are described in the context of an exemplary network shown in FIG. 1, it should not be construed as limiting the spirit and scope of the present disclosure. The principle and concept of the present disclosure may be more generally applicable to other network architectures.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. A method implemented at a first network node in a wireless core network with service based architecture, comprising:
   determining, in response to trigger of network function selection for a terminal device of the wireless core network, at least one subscriber group that the terminal device is matched with; and
   storing the at least one network function instance in association with the at least one subscriber group, comprising storing the at least one network function instance in association with the at least one subscriber group for a certain period, such that after the certain period expires, the network function instance is updated.

2. The method according to claim 1, further comprising:
   retrieving at least one network function instance for the at least one subscriber group.

3. The method according to claim 2 wherein retrieving at least one network function instance corresponding to the at least one subscriber group comprises:
   sending a first request for discovering network function instance, the first request comprising a subscriber group identifier of the at least one subscriber group; and
   receiving a first response comprising at least one network function instance for the subscriber group.

4. The method according to claim 1, further comprising:
   obtaining subscriber group information of a plurality of subscriber groups.

5. The method according to claim 4, wherein the subscriber group information comprises a subscriber group identifier.

6. The method according to claim 5, wherein the subscriber group identifier is an identifier mapped to at least one International Mobile Subscriber Identity (IMSI) range or a portion of Network Access Identifier (NAI) or a part or whole of network slice selection information.

7. The method according to claim 5 wherein the subscriber group identifier is specific to a network function.

8. The method according to claim 4, wherein obtaining subscriber group information of the plurality of subscriber groups comprises:
   sending a second request for querying subscriber group information of the plurality of subscriber groups; and
   receiving a second response comprising the subscriber group information.

9. The method according to claim 4, wherein obtaining subscriber group information of the plurality of subscriber groups comprises:
   receiving the subscriber group information from another first network node.

10. The method according to claim 1 wherein determining at least one subscriber group that the terminal device is matched with comprises:
    obtaining a subscriber identifier of the terminal device and/or network slice selection information provided by the terminal device; and
    deriving at least one subscriber group identifier from the subscriber identifier and/or the network slice selection information.

11. The method according to claim 10 wherein the subscriber identifier of the terminal device is an International Mobile Subscriber Identity (IMSI) or a Network Access Identifier (NAI).

12. The method according to claim 1, further comprising:
    checking whether any network function instance has been cached locally for the subscriber group that the terminal device is matched with;
    wherein the retrieving is performed in response to no network function instance being cached locally for the subscriber group.

13. The method according to claim 1, wherein the first network node is a network function service consumer.

14. The method according to claim 13, wherein the network function service consumer is an Access and Mobility Management Function (AMF).

15. An apparatus in a first network node in a wireless core network with service based architecture, comprising:
    a processor; and
    a memory coupled to the processor, said memory containing instructions executable by said processor, whereby said apparatus is operative to:
      determine, in response to trigger of network function selection for a terminal device of the wireless core network, at least one subscriber group that the terminal device is matched with; and
      store the at least one network function instance in association with the at least one subscriber group, wherein to store the at least one network function instance in association with the at least one subscriber group, said memory contains further instructions executable by said processor, whereby said apparatus is further response to store the at least one network function instance in association with the at least one subscriber group for a certain period, such that after the certain period expires, the network function instance is updated.

16. The apparatus according to claim 15, wherein the first network node is a network function service consumer.

17. The apparatus according to claim 16, wherein the network function service consumer is an Access and Mobility Management Function (AMF).

* * * * *

UNITED STATES PATENT AND TRADEMARK OFFICE
CERTIFICATE OF CORRECTION

Page 1 of 2

PATENT NO. : 11,991,782 B2
APPLICATION NO. : 17/724966
DATED : May 21, 2024
INVENTOR(S) : Wang et al.

It is certified that error appears in the above-identified patent and that said Letters Patent is hereby corrected as shown below:

On the Title Page

On Page 2, Item (56), under "OTHER PUBLICATIONS", in Column 1, Line 1, delete "HangZhou," and insert -- Hangzhou, --, therefor.

On Page 2, Item (56), under "OTHER PUBLICATIONS", in Column 2, Line 28, delete "PCT/CN2018104780" and insert -- PCT/CN2018/104780 --, therefor.

On Page 2, Item (56), under "OTHER PUBLICATIONS", in Column 2, Line 62, delete "(was" and insert -- was --, therefor.

In the Drawings

In Fig. 9, Sheet 6 of 7, for Tag "902", in Line 1, delete "RETRIEVEING UNIT" and insert -- RETRIEVING UNIT --, therefor.

In the Specification

In Column 1, Line 3, below "TITLE", insert -- This application is a continuation, under 35 U.S.C. § 120, of U.S. Patent Application 16/755,260 filed on Apr. 10, 2020, now U.S. Pat. No. 11,343,669, which is a U.S. National Stage Filing under 35 U.S.C. § 371 of International Patent Application Serial No. PCT/CN2018/104780 filed Sep. 10, 2018 and entitled "METHOD AND APPARATUS FOR NETWORK FUNCTION SERVICE DISCOVERY" which claims priority to International Patent Application No. PCT/CN2017/106059 filed Oct. 13, 2017 both of which are hereby incorporated by reference in their entirety. --, therefor.

In Column 1, Lines 26-27, delete "(Access and mobility Function)," and insert -- (Access and Mobility Management Function), --, therefor.

Signed and Sealed this
Eighteenth Day of February, 2025

Coke Morgan Stewart
*Acting Director of the United States Patent and Trademark Office*

CERTIFICATE OF CORRECTION (continued)
U.S. Pat. No. 11,991,782 B2

In Column 1, Line 28, delete "(Authentication Service Function)," and insert -- (Authentication Server Function), --, therefor.

In Column 6, Line 40, delete "illustrate" and insert -- illustrates --, therefor.

In Column 6, Line 48, delete "illustrate" and insert -- illustrates --, therefor.

In Column 11, Line 51, delete "OAM (Operation and Management)" and insert -- OAM (Operation, Administration and Management) --, therefor.

In Column 12, Line 32, delete "repository" and insert -- repository of --, therefor.

In Column 16, Line 29, delete "Blue-ray" and insert -- Blu-ray --, therefor.